United States Patent [19]
Aronne

[11] Patent Number: 5,303,881
[45] Date of Patent: Apr. 19, 1994

[54] FORE AND AFT ARTICULATION ADJUSTMENT OF PILOT EJECTION SEAT

[75] Inventor: Armand J. Aronne, Massapequa, N.Y.

[73] Assignee: Grumman Aerospace Corporation, Bethpage, N.Y.

[21] Appl. No.: 933,089

[22] Filed: Aug. 21, 1992

[51] Int. Cl.[5] .............................................. B64D 11/06
[52] U.S. Cl. ........................... 244/122 R; 244/122 A; 244/118.5; 297/344.1
[58] Field of Search ............ 244/122 R, 122 A, 118.5; 297/344, 330

[56] References Cited

U.S. PATENT DOCUMENTS

| | | | |
|---|---|---|---|
| 4,309,015 | 1/1982 | Mahr | 297/330 X |
| 4,484,722 | 11/1984 | Larson et al. | 244/122 R X |
| 4,667,901 | 5/1987 | Herndon | 244/122 A X |
| 4,787,576 | 11/1988 | McGrady et al. | 244/122 R |

Primary Examiner—Margaret A. Focarino
Assistant Examiner—Christopher P. Ellis
Attorney, Agent, or Firm—Pollock, Vande Sande & Priddy

[57] ABSTRACT

Threaded shafts engage threaded fittings at the top and bottom of a pilot's ejection seat. A motorized gear train selectively rotates the threaded shafts so as to adjust the fore-aft position of a seat while maintaining it behind a pre-designed emergency ejection path from a cockpit.

4 Claims, 3 Drawing Sheets

FORE AND AFT ARTICULATION ADJUSTMENT OF PILOT EJECTION SEAT

FIELD OF THE INVENTION

The present invention relates to pilot ejection seats, and more particularly to a means for adjusting the position of the seat within a cockpit.

BACKGROUND OF THE INVENTION

In conventional military aircraft, a pilot ejection seat is normally adjustable in vertical height only. With the advent of female aviators flying combat aircraft, it is necessary to accommodate a greater range of human dimensions.

A simple slide mechanism for fore-aft displacement must be accomplished while maintaining the seat well behind the ejection path. Further, the ejection seat must include means for absorbing most of the ejection loads exerted upon the seat during an emergency pilot ejection.

BRIEF DESCRIPTION OF THE PRESENT INVENTION

The present invention is capable of producing a seat which is easily adjustable to six-seven inches fore and aft and is still behind the ejection path within the entire displacement range.

The present seat structure includes a honeycomb plate which supports the seat from a top bulkhead seat support fitting to a seat bottom attachment fitting. A threaded arm mechanism on both the top and bottom of the seat pushes the seat fore and aft. Regardless of the position of the seat, the honeycomb plate absorbs most of the ejection loads during an emergency procedure.

Thus, the present invention accommodates extremes of pilot reach thereby enabling full manual control accompanied by a safe disposition of the seat in the event of emergency ejection.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
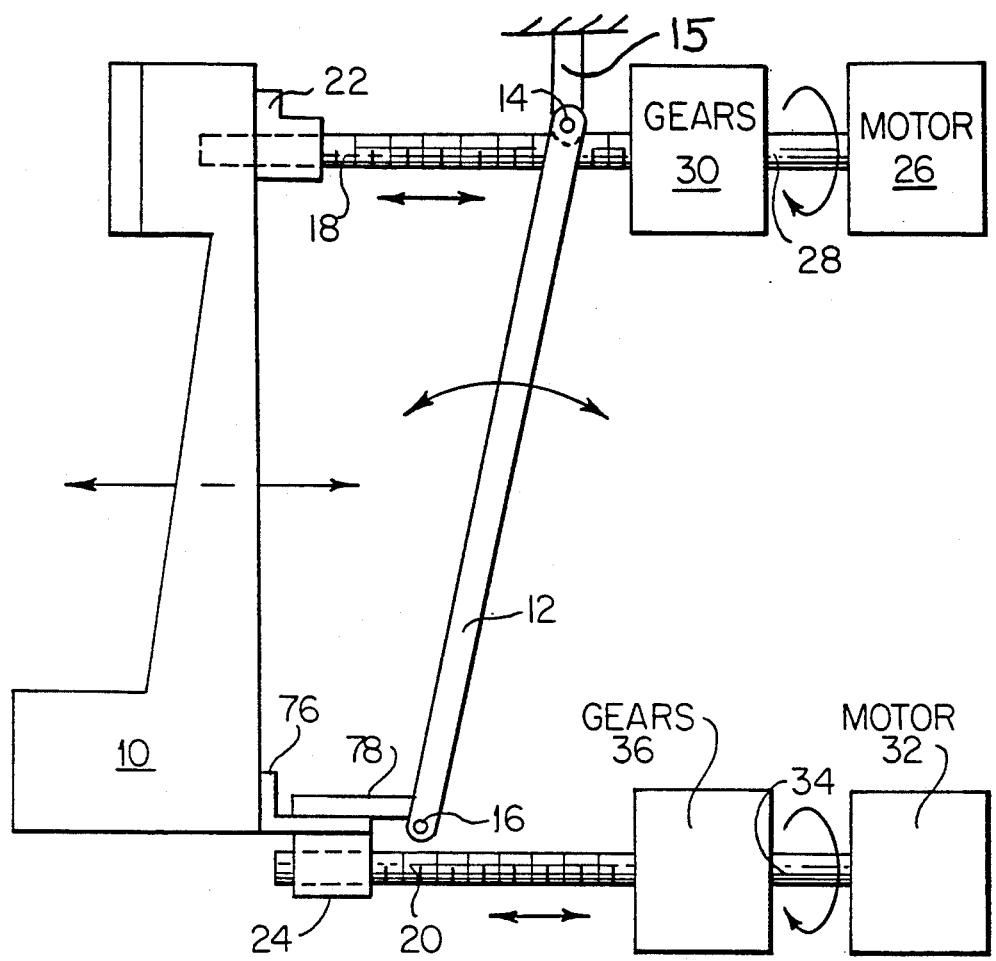
FIG. 1 is a simplified diagrammatic view of the present invention.

Referring to the figures, and more particularly FIG. 1, reference numeral 10 generally denotes a pilot ejection seat as used in military aircraft. A honeycomb support plate 12 is spaced from the seat and absorbs ejection loads in the event pilot ejection becomes necessary from a cockpit. The top and bottom of honeycomb plate 12 are pivotally mounted as indicated at reference numerals 14 and 16, respectively. Fixed clevis 15 supports the pivot 14.

Two parallel spaced horizontal threaded shafts 18 (FIG. 2) threadingly engage fittings 22 at the top of the seat while parallel-spaced threaded shafts 20 (FIG. 2) threadingly engage corresponding fittings 24 at the bottom of seat 10. As will be explained hereinafter, the threaded shafts 18 and 20 independently adjust the fore and aft positions of the seat and further enables the pilot to adjust seat tilt.

The threaded arm mechanism is powered by motors. The top mechanism is associated with motor 26 having an output shaft 28 which drives gears 30 that cause rotation of the threaded shafts 18. Similarly, motor 32 has an output shaft 34 which drives gears 36 associated with the lower parallel threaded shafts 20.

Figure 2:
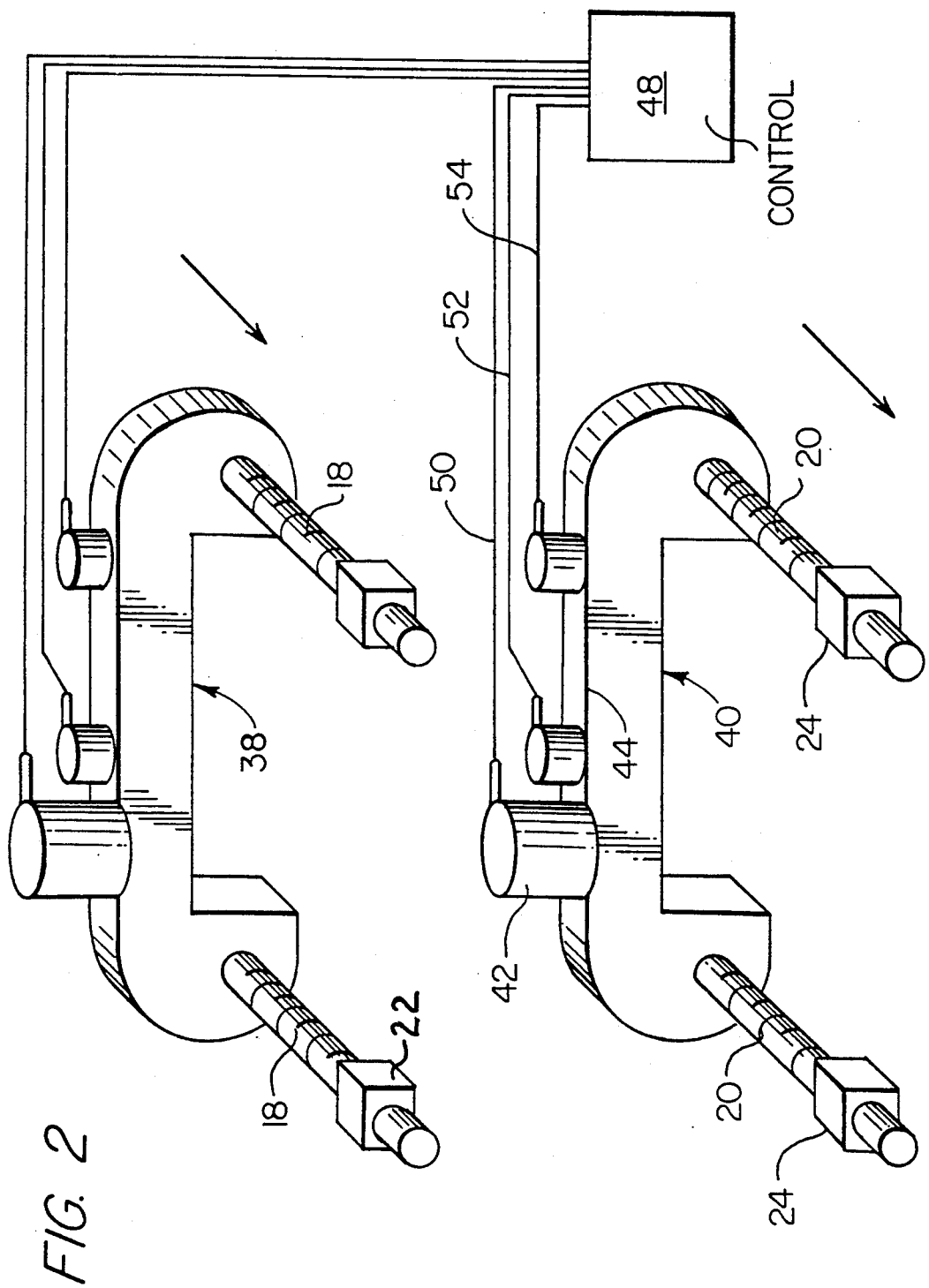
FIG. 2 is a perspective view of upper and lower adjustment mechanisms constituting the present invention.

FIG. 2 is a perspective view of the upper and lower threaded arm mechanisms. The mechanisms may be virtually identical and include a motor enclosure 42 seated above a yoke-shaped housing 44. Electrical wire 50 connects the motor 32 located within enclosure 42 to a source of electrical power through a manual control switch 48. The motor drives the mechanism, as will be explained in connection with FIG. 3.

Figure 3:
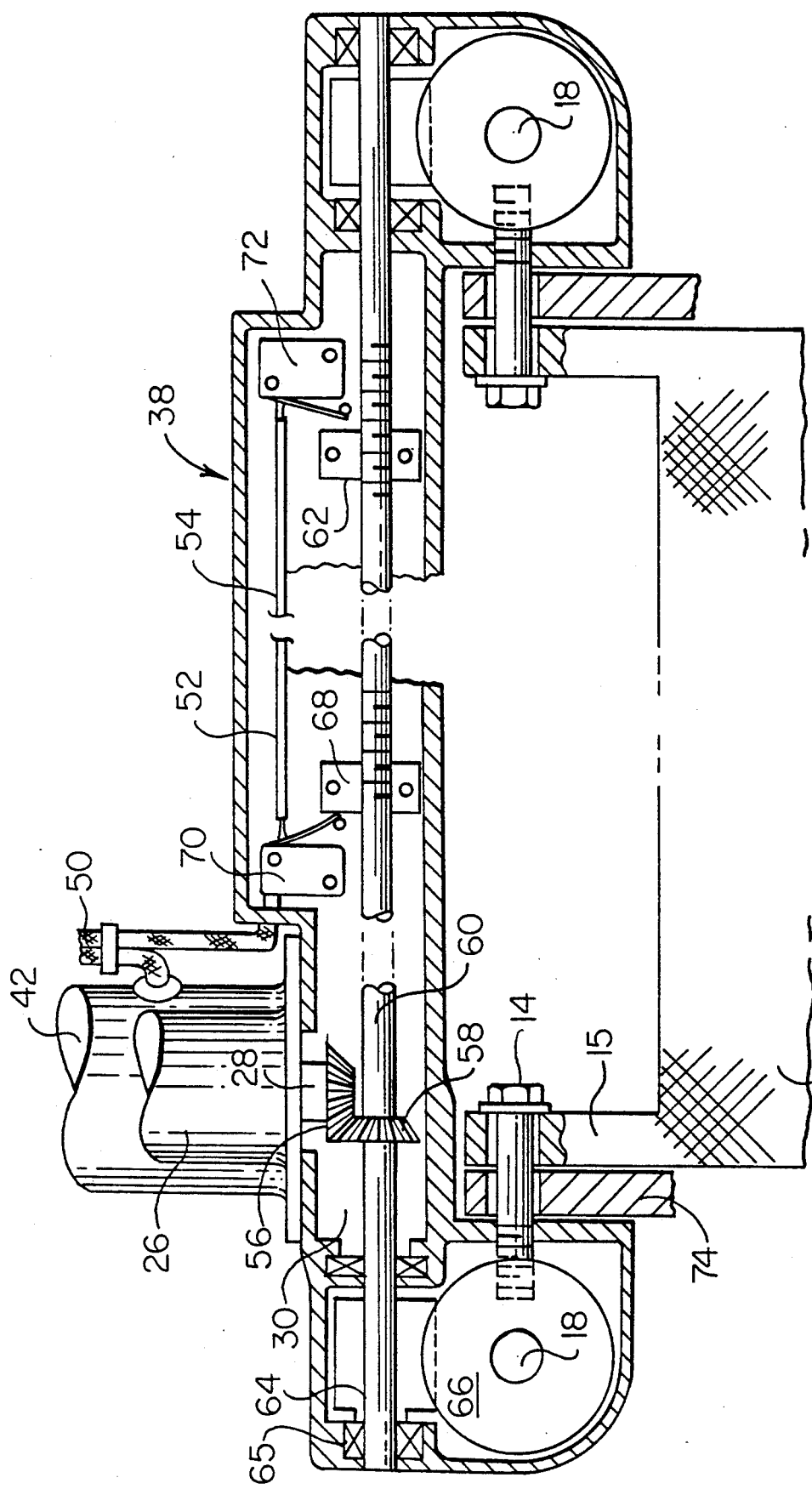
FIG. 3 is a sectional view taken through one of the adjustment mechanisms indicated in FIG. 2.

FIG. 3 illustrates the threaded arm mechanism in greater detail. The assembly depicted in FIG. 3 is associated with the top of the seat 10. The motor 26 and its output shaft 28 are shown connected to bevel gears 56 and 58. The latter-mentioned bevel gear is concentrically mounted to a shaft 60 which in turn threadingly engages stop blocks 62 and 68. The stop blocks act as actuators for microswitches 70 and 72. These stop blocks define the extreme right and left displacements permissible before the limit microswitches 70 and 72 interrupt power to the motor 26. This will limit the final fore and aft displacement range of seat 10. Opposite ends of shaft 60 are journalled in bearings 65 and the shaft end portions are concentrically fixed to worm gears 64. Referring to the left side of FIG. 3, the worm gear 64 is seen to mesh with an orthogonally mounted worm gear 66 to achieve orthogonal rotation displacement from shaft 60 to shaft 18 which is concentrically mounted to the worm gear 66. Accordingly, the gears generally indicated by reference numeral 30 in FIG. 1 include the bevel and worm gears just described which turn the threaded shafts 18 when motor 26 is energized.

The lower illustrated portion of FIG. 3 illustrates the pivotal mounting of honeycomb plate 12 to a bulkhead seat support fitting 74. As previously mentioned, it is this honeycomb plate which absorbs loads during emergency ejection.

Figure 4:
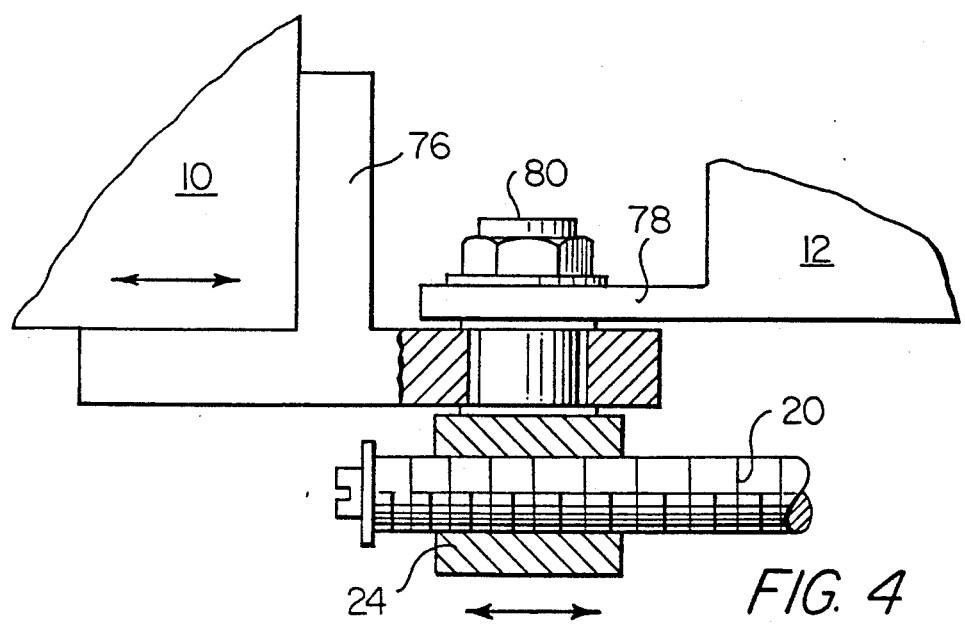
FIG. 4 is a partial sectional view of a lower fitting employed in the present invention.

FIG. 4 illustrates the connection between the lower seat fitting and the threaded shaft 20. As will be observed in the figure, the plate 76 is bolted to the honeycomb plate 12 via an appending lug 78. These parts are secured together with a bolt 80 which extends downwardly to a threaded fitting 24 which receives the threaded shaft 20. Thus, as shaft 20 rotates, the fitting 24 translates and changes the fore-aft position of the seat bottom. A similar operation occurs at the top of the seat with the exception that the appending lug 78 is absent thereby permitting the top of honeycomb plate 12 to pivot freely. The honeycomb plate 12 is pivotally mounted as indicated at reference numerals 14 and 16, on the top and bottom of the honeycomb plate 14, respectively.

According to the description provided hereinabove, it will be appreciated that the present invention improves the adjustment capability of an ejection seat thereby accommodating a greater range of differently dimensioned pilots.

It should be understood that the invention is not limited to the exact details of construction shown and described herein for obvious modifications will occur to persons skilled in the art.

I claim:

1. An adjustment mechanism for an ejection seat having seat and back sections, the mechanism comprising:
- a plurality of threaded shafts threadingly engaging fittings respectively connected to the seat and back sections for adjusting the fore-aft position of the ejection seat;
- gear means for rotating the threaded shafts;
- motor means connected to the gear means for driving the gear means;
- means connected to the gear means for limiting the fore-aft displacement of the ejection seat to positions behind a preselected seat ejection path; and
- a seat support plate for absorbing ejection loads; the plate
  - (a) pivotally mounted at a first end thereof to a fixed pivot support; and
  - (b) an opposite end of the support plate is pivotally connected to a preselected section of the ejection seat for fore-aft movement therewith.

2. A pilot ejection seat articulation assembly for adjusting fore and aft positions of the seat, comprising:
- two upper and two lower first threaded shafts threadingly engaging corresponding fittings which are respectively connected to seat and back sections of the ejection seat individually adjusting the fore-aft position of the seat and back sections;
- first and second elongated housings from which the upper and lower shafts respectively extend, wherein each housing includes
  - (a) motor means mounted to the housing,
  - (b) a second threaded shaft located in the housing for driving the first threaded shafts,
  - (c) gear means connected between the second thread shaft and a motor means output,
  - (d) a first pair of worm gears mounted to the second shaft for rotation therewith,
  - (e) a second pair of worm gears meshing with respective gears of the first pair and orthogonally translating rotation therefrom,
  - (f) the threaded first shafts coaxially extending from the respective second worm gear pair;
- means responsive to displacement of the seat section to preselected limit positions for preventing displacement past the limit positions;
- a seat support honeycomb plate for absorbing ejection loads and pivotally mounted at a first end thereof to a fixed pivot support;
- an opposite end of the support plate being pivotally connected to the seat section of the ejection seat for fore-aft movement therewith.

3. The assembly set forth in claim 2 wherein the gear means comprise a pair of bevel gears for orthogonally translating rotation of the motor means output to the second threaded shaft.

4. The assembly set forth in claim 2 wherein the responsive means comprise first and second fixed microswitches individually actuated to open circuit the motor means when the stop blocks are driven to their respective limit positions.

* * * * *